United States Patent
Noguchi et al.

(10) Patent No.: US 7,075,908 B2
(45) Date of Patent: Jul. 11, 2006

(54) WIRELESS DATA COMMUNICATION NETWORK SWITCHING DEVICE AND PROGRAM THEREOF

(75) Inventors: Yuichiro Noguchi, Kawasaki (JP); Satoru Chikuma, Kawasaki (JP); Gorou Sekiguchi, Kawasaki (JP); Nobutsugu Fujino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 900 days.

(21) Appl. No.: 09/960,404

(22) Filed: Sep. 24, 2001

(65) Prior Publication Data

US 2002/0168959 A1    Nov. 14, 2002

(30) Foreign Application Priority Data

May 10, 2001   (JP)   ............... 2001-139416

(51) Int. Cl.
*H04Q 7/00*    (2006.01)
*H04L 12/28*   (2006.01)

(52) U.S. Cl. .............. 370/329; 370/238; 370/356; 370/401

(58) Field of Classification Search ........... 370/328, 370/329, 330, 331, 332, 333, 345, 349, 352, 370/353, 354, 355, 356, 401, 238
See application file for complete search history.

(56) References Cited

U.S. PATENT DOCUMENTS

| | | | |
|---|---|---|---|
| 5,528,664 A * | 6/1996 | Slekys et al. | 455/452.1 |
| 6,584,098 B1 * | 6/2003 | Dutnall | 370/354 |
| 6,608,832 B1 * | 8/2003 | Forslow | 370/353 |
| 6,647,001 B1 * | 11/2003 | Bhagavath et al. | 370/331 |
| 6,693,892 B1 * | 2/2004 | Rinne et al. | 370/348 |
| 2001/0055286 A1 * | 12/2001 | Lin et al. | 370/329 |

* cited by examiner

*Primary Examiner*—Afsar Qureshi
(74) *Attorney, Agent, or Firm*—Staas & Halsey LLP

(57) ABSTRACT

A communication network switching device is provided between a client and a server as a intermediary mechanism to estimate a traffic and to issue a switching request for communication networks. Two switching devices include units for releasing a session in cooperation with each other and units for resuming the session in cooperation with each other. The client switching device includes a unit for connecting to a communication network to which the communication is to be switched after the session release is complete and for acquiring a new communication address assigned through the connection and a unit for notifying the server switching device of the acquired communication address. The server switching device includes a unit for identifying a server pointed to by a port number specified in a service request to transfer the service request and a unit for acquiring the new communication address acquired by the client switching device.

17 Claims, 13 Drawing Sheets

FIG. 4

| PORT NUMBER | SERVER ADDRESS | APPLICATION TYPE |
|---|---|---|
| 8080 | 192.168.5.10 | WWW |
| 110 | 192.168.5.11 | MAIL(POP) |
| 25 | 192.168.5.12 | MAIL(SMTP) |

WIRELESS DATA COMMUNICATION NETWORK SWITCHING DEVICE AND PROGRAM THEREOF

BACKGROUND OF THE INVENTION

1. Field of the Invention

The present invention relates generally to a wireless data communication network switching device used for a wireless data communication system and a wireless data communication network switching program used to implement the wireless data communication network switching device, and more specifically to a wireless data communication network switching device which can implement automatic switching of wireless data communication networks for least cost (or optimized charge) without change to any existing access router as well as to any existing client or server, and a wireless data communication network switching program used to implement the wireless data communication network switching device.

2. Description of the Related Art

Recently, in a wireless wide area network (wireless WAN) such as a mobile telephone network, data communication services employing packet-switched network technology, including the "i-mode" service available from NTT DoCoMo, Inc., have been rising in popularity.

Such a packet-switched network has an advantage that its service charge is lower than that of a circuit-switched network for small communication traffic such as a text mail. However, when the size of contents is large as is the case with a huge file attached to a mail or an image content for WWW, the circuit-switched network would have an advantage over the packet-switched network in terms of service charge.

In general, it is considered that the packet-switched network is more suitable for a small discrete communication traffic, while the circuit-switched network is more suitable for a large continuous communication traffic and thus, there is an increasing need for automatic switching of communication networks depending on a communication traffic.

For indoor use, the advent of a new communication scheme such as Bluetooth (a short-range wireless transmission technology) in addition to the conventional IEEE 802.11 standard promotes the widespread proliferation of wireless local area network (wireless LAN) systems in offices and homes and thus, there has been a drastic increase in users who adopt a wireless WAN system for outdoor use and a wireless LAN system for indoor use such as office or home use.

Such a user would feel an increasing need to have a service which can automatically switch from the chargeable wireless WAN system to the no-charge wireless LAN system when the user goes back to his/her office or home from the outdoors.

Automatic switching of prior wireless data communication networks for least cost has been usually accomplished within a single wireless data communication network such as a PHS system using an ISDN service called Always On/Dynamic ISDN (AO/DI) or a wireless data communication network using the Bandwidth Allocation Protocol/Bandwidth Allocation Control Protocol (BAP/BACP)

More specifically, as shown in FIG. 12, the automatic switching of a packet switching channel and a circuit switching channel within a single wireless data communication network has been accomplished cooperatively between a mobile computer and an access router by using the functions specific to the wireless data communication network and the functions of its link layer.

However, for numerous wireless data communication networks such as the PDC-P and PDC networks available from NTT DoCoMo, Inc., the PacketOne and cdmaOne networks available from KDDI, and the W-CDMA packet-switched and circuit-switched networks made available from NTT DoCoMo, Inc., separate packet-switched and circuit-switched networks have been actually provided.

Meanwhile, in such a wireless data communication network, as shown in FIG. 13, there have been provided access routers dedicated to the packet-switched and circuit-switched networks, respectively, and no mechanism has been provided for cooperation between these access routers.

Therefore, in accordance with the prior arts, the user may be forced to pay a higher service charge since there exists no mechanism for switching between the packet-switched and circuit-switched networks.

To solve this problem, automatic switching of different wireless data communication networks must be implemented and in addition, some mechanism must be provided for cooperation between access routers provided for these wireless data communication networks.

More specifically, since an access router provided for a packet-switched network assigns a terminal an IP address different from that assigned to the terminal by another access router provided for a circuit-switched network, switching between the packet-switched network and the circuit-switched network may cause abnormal termination of communication because the terminal may be recognized as a different one. Therefore, there is a need for mechanism to solve this problem.

However, these access routers are usually provided not only for a user's intranet but also for a carrier network or an Internet service provider (ISP) and thus, a mechanism to be provided for cooperation between them may require a considerable change to the existing infrastructure, thereby making it very expensive.

Moreover, the automatic switching adopted for the prior ISDN service AO/DI (i.e. the automatic switching of a packet switching channel and a circuit switching channel within a single wireless data communication network) is performed from the packet switching channel to the circuit switching channel when the communication traffic exceeds a predetermined value and thus, it may cause an increased service charge.

Therefore, if the communication traffic increases abruptly and then decreases, the prior system will perform the automatic switching even though it may result in a higher service charge than the case where the channels would not be switched.

SUMMARY OF THE INVENTION

The present invention has been made in view of these problems described above, and it is an object of the present invention to provide a new wireless data communication network switching device which can implement automatic switching of wireless data communication networks for least cost without change to any existing access router as well as to any existing client or server.

It is another object of the present invention to provide a new wireless data communication network switching program which can implement automatic switching of wireless data communication networks for least cost without change to any existing access router as well as to any existing client or server.

It is still another object of the present invention to provide a wireless data communication network switching program recording medium on which a new wireless data communication network switching program is recorded, wherein the program can implement automatic switching of wireless data communication networks for least cost without change to any existing access router as well as to any existing client or server.

A wireless data communication network switching device according to the present invention is provided in a mobile computer on which a client is deployed and which is capable of connecting to a plurality of wireless data communication networks, operates as a intermediary mechanism for the client, and controls switching of the wireless data communication networks in cooperation with a server side switching device operating as a intermediary mechanism for a server with which the client communicates. The wireless data communication network switching device comprises means for releasing a session being established in a response to a switching request for the wireless data communication networks in cooperation with the server side switching device; means for connecting to a wireless data communication network to which the communication is to be switched and acquiring a new communication address assigned in response to the connection, after the release is complete; means for notifying the server side switching device of the communication address; and means for resuming the released session in cooperation with the server side switching device following the notification.

Another wireless data communication network switching device according to the present invention operates as a intermediary mechanism for a server and controls switching of wireless data communication networks in cooperation with a client side switching device operating as a intermediary mechanism for a client with which the server communicates. The wireless data communication network switching device comprises means for transferring a service request to the server by identifying a server pointed to by a port number specified in the service request issued by the client; means for releasing a session being established in a response to a switching request for the wireless data communication networks in cooperation with the client side switching device; means for acquiring a communication address for the client side switching device assigned by a wireless data communication network switched by the client side switching device in response to the switching request; and means for resuming the released session in cooperation with the client side switching device following the acquisition.

A wireless data communication network switching method according to the present invention is executed on a device which is provided in a mobile computer deployed a client thereon and capable of connecting to a plurality of wireless data communication networks, which operates as a intermediary mechanism for the client, and which controls switching of the wireless data communication networks in cooperation with a server side switching device operating as a intermediary mechanism for a server with which the client communicates. The wireless data communication network switching method comprises releasing a session being established in a response to a switching request for the wireless data communication networks in cooperation with the server side switching device; connecting to a wireless data communication network to which the communication is to be switched and acquiring a new communication address assigned in response to the connection, after the release is complete; notifying the server side switching device of the communication address; and resuming the released session in cooperation with the server side switching device following the notification.

Another wireless data communication network switching method according to the present invention is executed on a device which operates as a intermediary mechanism for a server and which controls switching of wireless data communication networks in cooperation with a client side switching device operating as a intermediary mechanism for a client with which the server communicates. The wireless data communication network switching method comprises transferring a service request to the server by identifying a server pointed to by a port number specified in the service request issued by the client; releasing a session being established in a response to a switching request for the wireless data communication networks in cooperation with the client side switching device; acquiring a communication address for the client side switching device assigned by a wireless data communication network switched by the client side switching device in response to the switching request; and resuming the released session in cooperation with the client side switching device following the acquisition.

A wireless data communication network switching program according to the present invention is executed on a device which is provided in a mobile computer deployed a client thereon and capable of connecting to a plurality of wireless data communication networks, which operates as a intermediary mechanism for the client, and which controls switching of the wireless data communication networks in cooperation with a server side switching device operating as a intermediary mechanism for a server with which the client communicates. The wireless data communication network switching program causes a computer to perform releasing a session being established in a response to a switching request for the wireless data communication networks in cooperation with the server side switching device; connecting to a wireless data communication network to which the communication is to be switched, and acquiring a new communication address assigned in response to the connection, after the release is complete; notifying the server side switching device of the communication address; and resuming the released session in cooperation with the server side switching device following the notification.

Another wireless data communication network switching program according to the present invention is executed on a device which operates as a intermediary mechanism for a server and which controls switching of wireless data communication networks in cooperation with a client side switching device operating as a intermediary mechanism for a client with which the server communicates. The wireless data communication network switching program causes a computer to perform transferring a service request to the server by identifying a server pointed to by a port number specified in the service request issued by the client; releasing a session being established in a response to a switching request for the wireless data communication networks in cooperation with the client side switching device; acquiring a communication address for the client side switching device assigned by a wireless data communication network switched by the client side switching device in response to the switching request; and resuming the released session in cooperation with the client side switching device following the acquisition.

A program recording medium according to the present invention records a wireless data communication network switching program executed on a device which is provided in a mobile computer deployed a client thereon and capable of connecting to a plurality of wireless data communication networks, which operates as a intermediary mechanism for the client, and which controls switching of the wireless data communication networks in cooperation with a server side switching device operating as a intermediary mechanism for a server with which the client communicates. The wireless data communication network switching program causes a computer to perform releasing a session being established in a response to a switching request for the wireless data communication networks in cooperation with the server side switching device; connecting to a wireless data communication network to which the communication is to be switched, and acquiring a new communication address assigned in response to the connection, after the release is complete; notifying the server side switching device of the communication address; and resuming the released session in cooperation with the server side switching device following the notification.

Another wireless data communication network switching program recording medium according to the present invention records a program which operates as a intermediary mechanism for a server to perform a process to control switching of the wireless data communication networks in cooperation with a client side switching device operating as a intermediary mechanism for a client with which the server communicates. The wireless data communication network switching program recording medium records a program which causes a computer to perform a processing for identifying a server pointed to by a port number specified in a service request issued by the client to transfer the service request to the server; a processing for responding to a switching request for the wireless data communication networks to release a session being established in cooperation with the client side switching device; a processing for acquiring a communication address for the client side switching device assigned by a wireless data communication network switched by the client side switching device in response to the switching request; and a processing for resuming the released session in cooperation with the client side switching device, following the acquisition.

Another program recording medium according to the present invention records a wireless data communication network switching program being executed on a device which operates as a intermediary mechanism for a server and which controls switching of wireless data communication networks in cooperation with a client side switching device operating as a intermediary mechanism for a client with which the server communicates. The wireless data communication network switching program causes a computer to perform transferring a service request to the server by identifying the server pointed to by a port number specified in a service request issued by the client; releasing a session being established in a response to a switching request for the wireless data communication networks in cooperation with the client side switching device; acquiring a communication address for the client side switching device assigned by a wireless data communication network switched by the client side switching device in response to the switching request; and resuming the released session in cooperation with the client side switching device following the acquisition.

BRIEF DESCRIPTION OF THE DRAWINGS

FIG. 4 shows an embodiment of a server information management table.

DETAILED DESCRIPTION OF THE PREFERRED EMBODIMENTS

Figure 1:
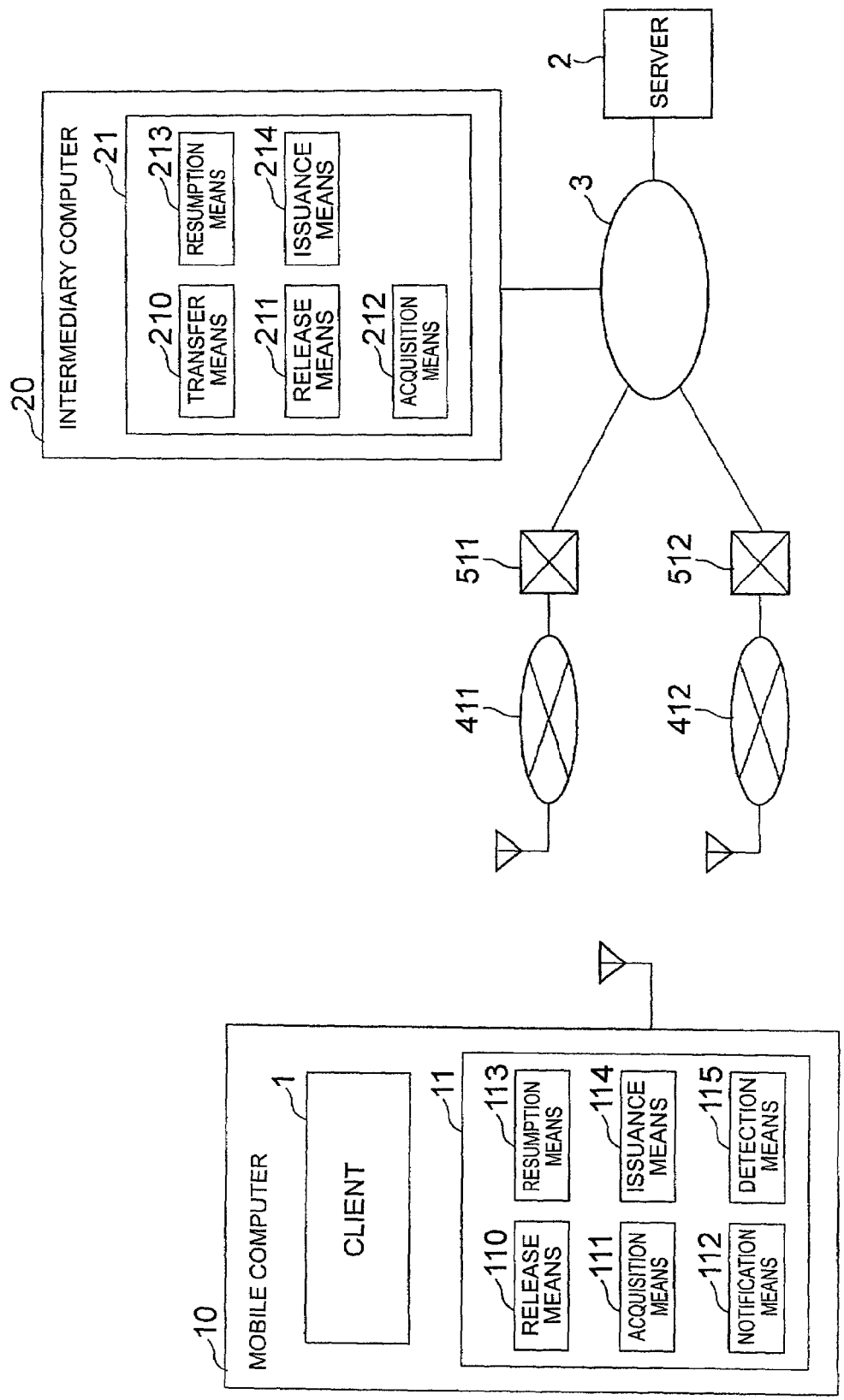
FIG. 1 is a schematic block diagram illustrating the present invention.

FIG. 1 shows a schematic block diagram of the present invention. In FIG. 1, reference numeral 1 denotes a client requesting a service, 2 denotes a server providing a service, 3 denotes a network such as the Internet or an intranet, 411 denotes a first wireless data communication network such as a packet-switched network, 412 denotes a second wireless data communication network such as a circuit-switched network, 511 denotes a first access router provided for the first wireless data communication network 411, 512 denotes a second access router provided for the second wireless data communication network 412, 10 denotes a mobile computer which deploys the client 1 and comprises a wireless data communication network switching device 11 according to the present invention, and 20 denotes a intermediary computer which is physically connected to the network 3 and comprises a wireless data communication network switching device 21 according to the present invention.

The mobile computer 10 is capable of using a plurality of wireless data communication networks (such as the first wireless data communication network 411 and the second wireless data communication network 412) and uses a communication address assigned by an access router provided for each wireless data communication network (such as the first access router 511 and the second access router 512) to communicate with the server 2 on the network 3.

The wireless data communication network switching device 11 according to the present invention provided in the mobile computer 10 operates as a intermediary mechanism for the client 1 to control switching of the wireless data communication networks in cooperation with the wireless data communication network switching device 21 according to the present invention which operates as a intermediary mechanism for the server 2 and it comprises release means 110, acquisition means 111, notification means 112, and resumption means 113 and it may further comprise issuance means 114 and detection means 115.

The release means 110 responds to a switching request for the wireless data communication networks to release a session being established in cooperation with the wireless data communication network switching device 21. After the session release by the release means 110 is complete, the acquisition means 111 connects to a wireless data communication network to which the communication is to be switched and acquires a new communication address assigned in response to the connection.

The notification means 112 notifies the wireless data communication network switching device 21 of the communication address acquired by the acquisition means 111. Following the notification by the notification means 112, the resumption means 113 resumes the session released by the release means 110 in cooperation with the wireless data communication network switching device 21.

The issuance means 114 is provided when the wireless data communication network switching device 21 does not comprise an issuance means 214 described later, and issues a switching request for the wireless data communication networks. The detection means 115 detects whether a new wireless data communication network is made available.

The above-mentioned various means in the wireless data communication network switching device 11 according to the present invention are specifically implemented in computer programs, which can be stored in a suitable recording medium such as a semiconductor memory readable by a computer.

The wireless data communication network switching device 21 according to the present invention provided in the intermediary computer 20 operates as a intermediary mechanism for the server 2 to control switching of the wireless data communication networks in cooperation with the wireless data communication network switching device 11 according to the present invention which operates as a intermediary mechanism for the client 1 and it comprises transfer means 210, release means 211, acquisition means 212, and resumption means 213 and it may further comprise issuance means 214.

The transfer means 210 identifies the server 2 pointed to by a port number specified in a service request issued by the client 1 to transfer the service request to the server 2. The release means 211 responds to a switching request for the wireless data communication networks to release a session being established in cooperation with the wireless data communication network switching device 11.

The acquisition means 212 acquires a communication address for the wireless data communication network switching device 11 assigned by a wireless data communication network to which the communication is to be switched in response to the switching request for the wireless data communication networks. Following the acquisition by the acquisition means 212, the resumption means 213 resumes the released session in cooperation with the wireless data communication network switching device 11.

The issuance means 214 is provided when the wireless data communication network switching device 11 does not comprise the issuance means 114, and issues a switching request for the wireless data communication networks.

The above-mentioned various means in the wireless data communication network switching device 21 according to the present invention are specifically implemented in computer programs, which can be stored in a suitable recording medium such as a semiconductor memory readable by a computer.

According to the present invention as configured above, (a) the client 1 considers the wireless data communication network switching device 11 as a server and transmits a service request message, (b) in response thereto, the wireless data communication network switching device 11 considers the wireless data communication network switching device 21 as a server and transmits the service request message, (c) in response thereto, the wireless data communication network switching device 21 considers the server 2 as a server and transmits the service request message.

In the transmission of a service request message, the client 1 considers the wireless data communication network switching device 11 as a server and transmits a service request message thereto. If the wireless data communication network switching device 21 is not notified of the address of the server 2, the transfer means 210 of the wireless data communication network switching device 21 refers to a table for managing the correspondence between port numbers and server addresses by using the port number specified in the service request message as a key to identify the destination server 2 of the service request message, and then transmits the service request message to that server 2.

Next, (d) in response to this service request message, the server 2 considers the wireless data communication network switching device 21 as a client and returns a service response message, (e) in response thereto, the wireless data communication network switching device 21 considers the wireless data communication network switching device 11 as a client and returns the service response message, (f) in response thereto, the wireless data communication network switching device 11 considers the client 1 as a client and returns the service response message.

In this way, the present invention can perform data exchanges between the client 1 and the server 2 in a similar manner to those for the prior art wherein the wireless data communication network switching devices 11, 21 are not provided. Namely, the data exchanges between the client 1 and the server 2 can be performed without any increase in data quantity because no special header is appended.

During these data exchanges, the issuance means 114, 214 estimates a communication traffic between the client 1 and the server 2 by measuring the size of contents to be transmitted/received and determining the type of an application on the client 1, and then issues a switching request for the wireless data communication networks.

For example, a switching request to switch from a packet-switched network to a circuit-switched network is issued if a large communication traffic is estimated, and a switching request to switch from a circuit-switched network to a packet-switched network is issued if a small communication traffic is estimated.

In response to the issuance of such a switching request for the wireless data communication networks, the release means 110 in the wireless data communication network switching device 11 transmits a marker indicative of the last data when the session is suspended to inform the release means 211 in the wireless data communication network switching device 21 of the data that the device 21 should have received when the session is suspended and then safely releases the session being established in cooperation with the release means 211 in the wireless data communication network switching device 21.

In response to the completion of this session release, the acquisition means 111 in the wireless data communication network switching device 11 connects to a wireless data communication network to which the communication is to be switched and then acquires a communication address assigned by the wireless data communication network to which the communication is to be switched in response to the connection. In response thereto, the notification means 112 notifies the wireless data communication network switching device 21 of the acquired communication address.

In response to the notification of the acquired communication address, the acquisition means 212 in the wireless data communication network switching device 21 acquires a new communication address for the wireless data communication network switching device 21, so that the wireless data communication network switching device 21 can hereafter use this communication address to continue data transmission to the wireless data communication network switching device 11.

Following the notification of this communication address, the resumption means 113 in the wireless data communication network switching device 11 resumes the session released by the release means 110, 211 in cooperation with the resumption means 213 in the wireless data communication network switching device 21, so that the data transmission can be resumed.

With this configuration, the detection means 115 in the wireless data communication network switching device 11 provided in the mobile computer 10 detects whether a new wireless data communication network is made available and in response thereto, the issuance means 114 in the wireless data communication network switching device 11 determines whether the new wireless data communication network is more advantageous in service charge than the currently-used wireless data communication network and then issues a switching request to switch to the new wireless data communication network when it determines that the new wireless data communication network is more advantageous.

This configuration can allow the user to achieve automatic switching from a chargeable wireless WAN to a no-charge wireless LAN when the user goes back to his/her office or home from the outdoors.

Thus, according to the present invention, even when the communication address of the mobile computer 10 is changed due to switching of the wireless data communication networks, the client 1 and the server 2 can perform data exchanges without awareness of such a change and the wireless data communication networks can be switched to optimize the service charge.

In addition, this configuration for switching the wireless data communication networks can be implemented without any change to the existing access routers 5, 7 as well as to the existing client 1 or server 2.

Moreover, according to the present invention, since switching of the wireless data communication networks is accomplished based on an estimated communication traffic but it is not affected by temporary communication traffic conditions, further optimization of service charges can be achieved.

Thus, the present invention can meet the need to have a service which can automatically switch from a chargeable wireless WAN to a no-charge wireless LAN.

Now, the present invention will be described below in detail with reference to preferred embodiments.

Figure 2:
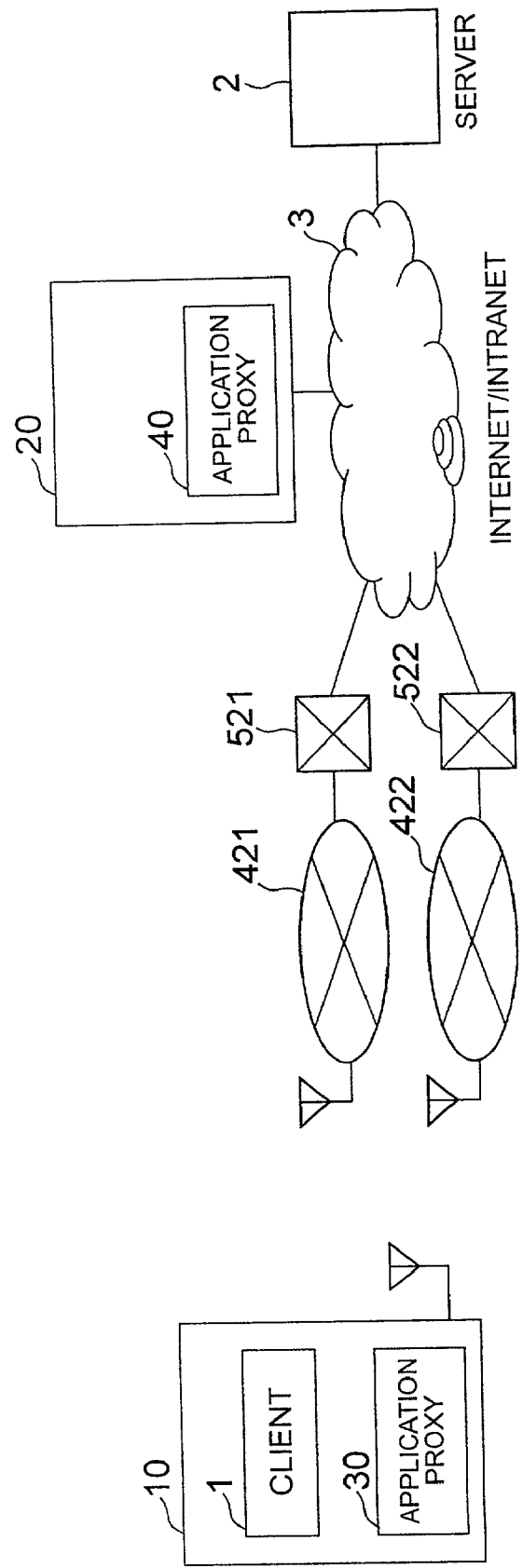
FIG. 2 shows an embodiment of the present invention.

FIG. 2 shows an embodiment of the present invention. In FIG. 2, the same elements are designated with the same numerals as those described for FIG. 1.

Reference numerals 421 and 422 denote wireless data communication networks available to a mobile computer 10, 521 denotes an access router provided for the wireless data communication network 421, 522 denotes an access router provided for the wireless data communication network 422, 30 denotes an application proxy provided in the mobile computer 10 to implement the present invention, and 40 denotes an application proxy provided for the intermediary computer 20 to implement the present invention.

Figure 3:
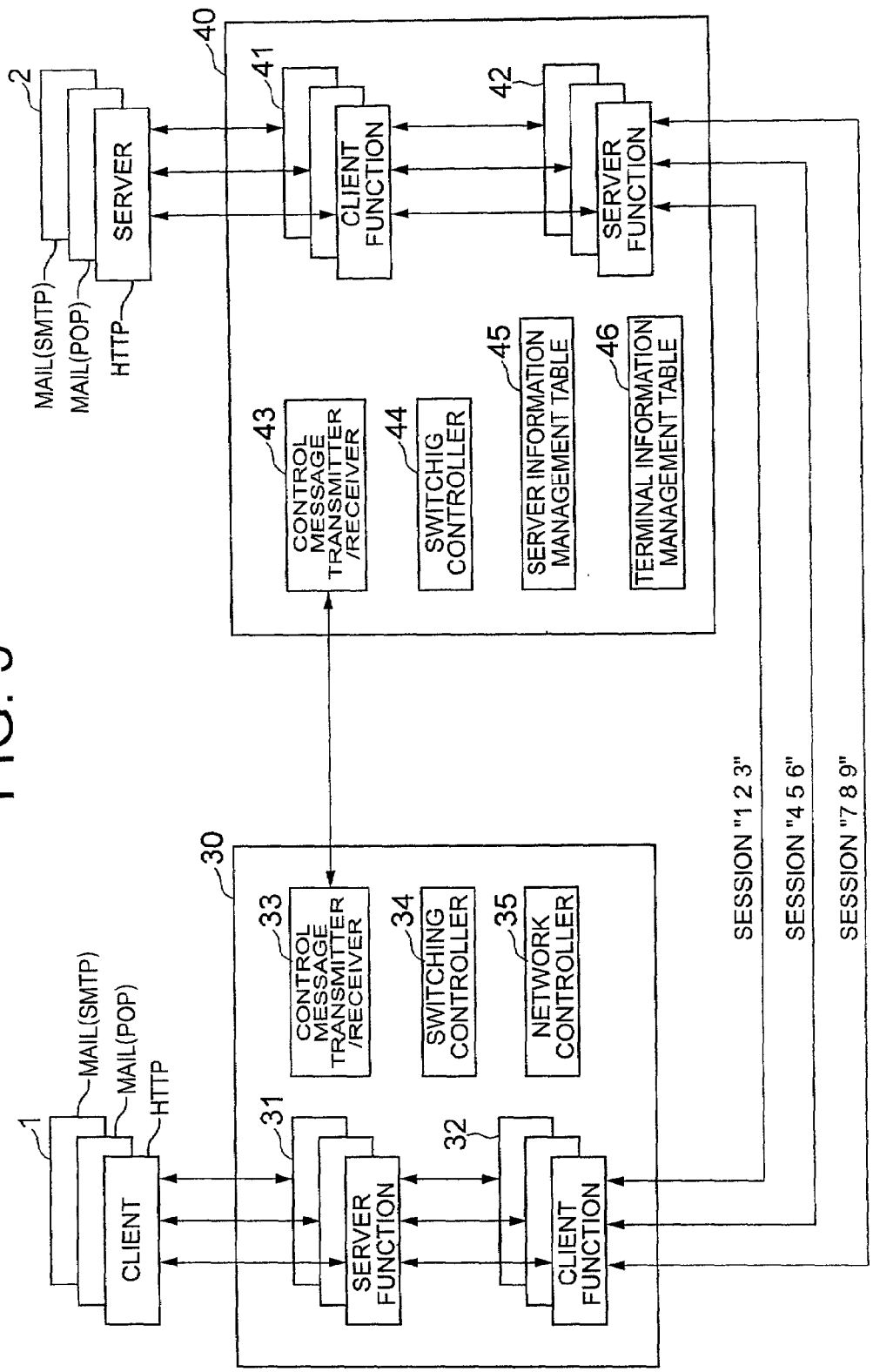
FIG. 3 shows an embodiment of a functional configuration which an application proxy has.

FIG. 3 shows an embodiment of a functional configuration of the application proxy 30 deployed in the mobile computer 10 as well as an embodiment of a functional configuration of the application proxy 40 deployed in the intermediary computer 20.

The application proxies 30, 40 can be specifically implemented in computer programs, which can be made available in the form of those recorded on a recording medium such as a semiconductor memory.

As shown in the figure, the application proxy 30 deployed in the mobile computer 10 comprises a server function 31 with respect to the client 1 (that is, a server socket function), a client function 32 with respect to the application proxy 40 (that is, a client socket function), a control message transmitter/receiver 33 for transmitting/receiving control messages to/from the application proxy 40, a switching controller 34 for determining the switching of wireless data communication networks based on a condition, and a network controller 35 for controlling and switching the wireless data communication networks.

The application proxy 40 deployed in the intermediary computer 20 comprises a client function 41 with respect to the server 2 (that is, a client socket function), a server function 42 with respect to the application proxy 30 (that is, a server socket function), a control message transmitter/receiver 43 for transmitting/receiving control messages to/from the application proxy 30, a switching controller 44 for determining the switching of wireless data communication networks based on a condition, a server information management table 45, and a terminal information management table 46.

As shown in FIG. 4, the server information management table 45 manages the correspondence between a port number (uniquely associated with an application type) and the IP address of a server 2 which provides an application service indicated by the port number.

Figure 5:
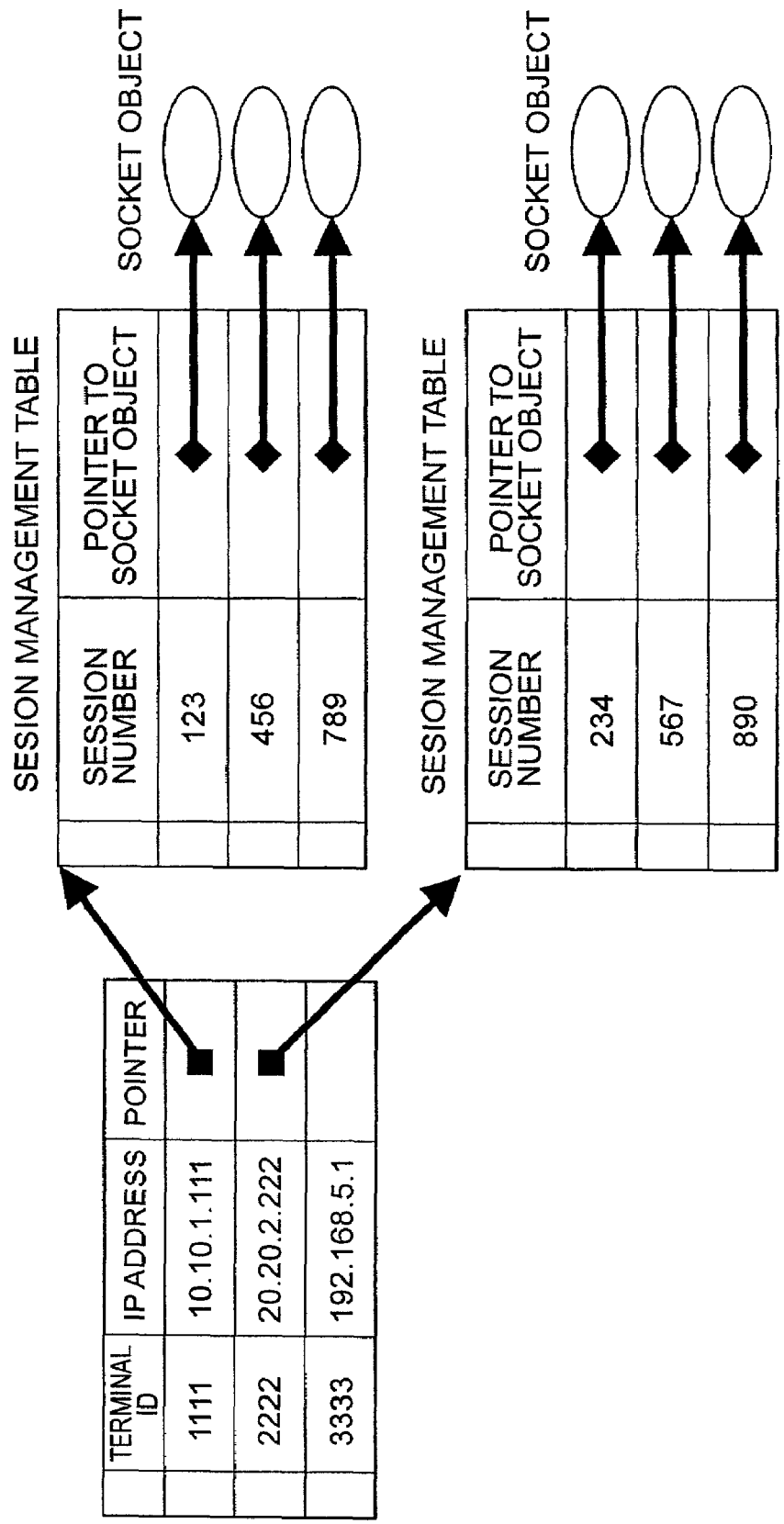
FIG. 5 shows an embodiment of a terminal information management table.

As shown in FIG. 5, the terminal information management table 46 manages the IP address of a mobile computer 10 by associating it with the terminal ID of the mobile computer 10 and uses also a session management table to manage the session number of a session being established by the mobile computer 10 (for example, "123"/"456"/"789" for the mobile computer 10 shown in FIG. 3) and a pointer to a server function 42 used by the session.

Now, the process according to the present invention as configured above will be described below in detail.

Figure 6:
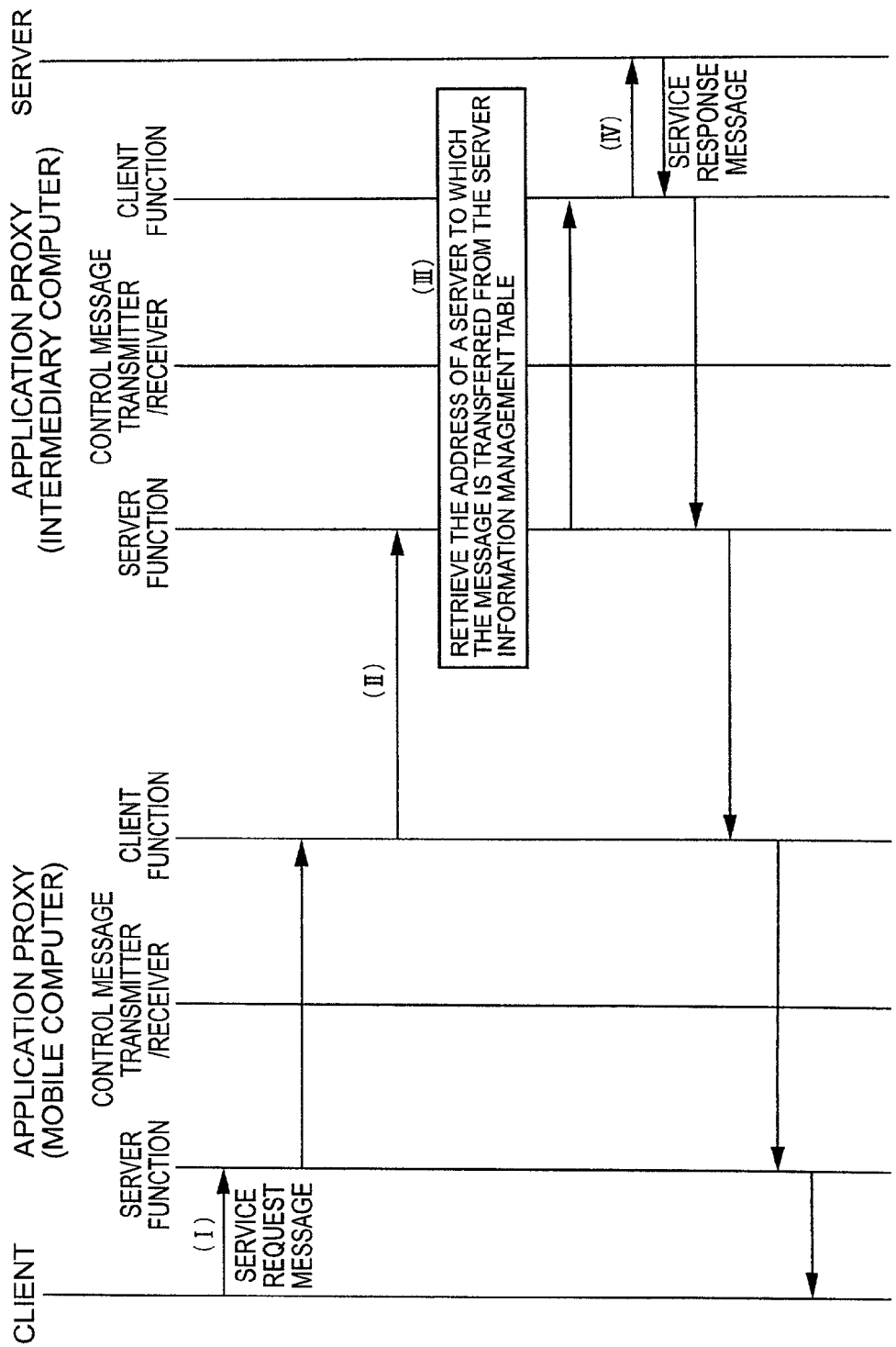
FIG. 6 is a sequence diagram illustrating a process of the present invention.

To begin with, we will describe that the present invention as configured above can allow the communication between the client 1 and the server 2 to be performed successfully during a normal operation. FIG. 6 is a sequence diagram illustrating the process.

It is assumed that the user has previously identified, to the client 1, the application proxy 30 of the mobile computer 10 as a server.

Thus, the application proxy 30 will be able to use the server function 31 to receive a service request message issued by the client 1 to the server 2 as shown by (I) in FIG. 6.

When the application proxy 30 of the mobile computer 10 receives the service request message issued by the client 1, it uses the client function 32 to transmit the received service request message to the application proxy 40 of the intermediary computer 20 as shown by (II) in FIG. 6.

When the application proxy 40 of the intermediary computer 20 uses the server function 42 to receive the service request message, it in turn uses the client function 41 to transmit the received service request message to the server 2 corresponding to the client 1 (application) as shown by (IV) in FIG. 6.

For these operations, the application proxy 40 must acquire the address of a server 2 to which the service request message is to be transferred but it can identify the port number used to receive the service request message because the message is received through the application-specific server function 42.

Thus, the application proxy 40 will acquire the address of a server 2 to which the service request message is to be transferred, by referring to the server information management table 45 shown in FIG. 4 with the identified port number as a search key as shown by (III) in FIG. 6.

In this way, the server 2 will be able to receive the service request message issued by the client 1 successfully.

On the contrary, a service response message from the server 2 will be transmitted in reverse order, thereby ensuring that the client 1 can receive the service response message returned from the server 2 successfully.

As described above, the configuration according to the present invention can allow the communication between the client 1 and the server 2 to be performed successfully during a normal operation.

Since the communication between the application proxy 30 of the mobile computer 10 and the application proxy 40 of the intermediary computer 20 is performed through the client function 32 and the server function 42, the data traffic is equal to that actually communicated between the client 1 and the server 2.

In other words, the introduction of the present invention will cause no increase in data quantity on a wireless data communication network, so that a decreased transmission efficiency or an increased service charge (especially, an increased service charge for using a packet-switched network) due to unnecessary header information appended can be avoided.

Figure 7:
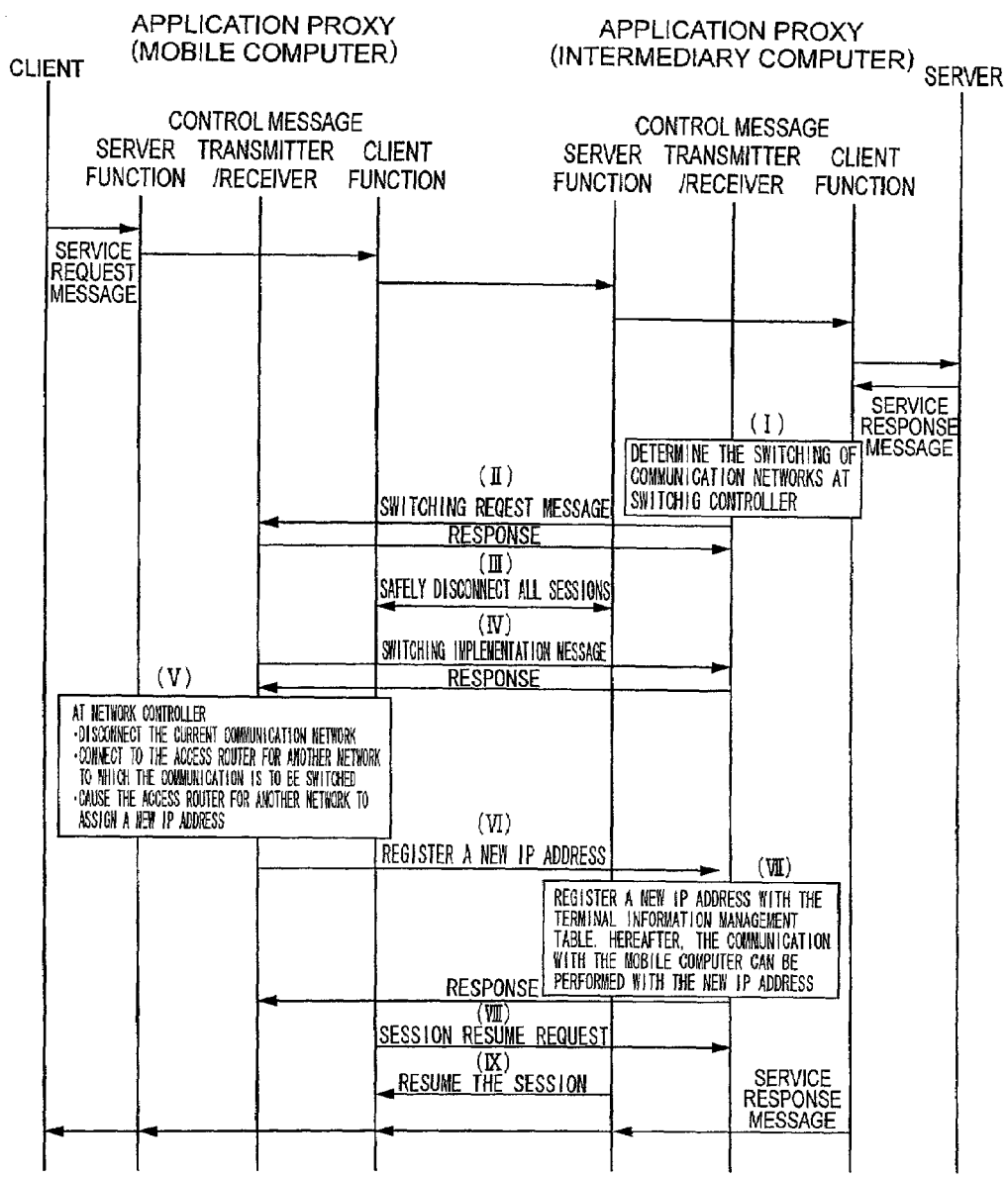
FIG. 7 is a sequence diagram illustrating a process of the present invention.

Next, we will describe that the present invention as configured above can allow for continuous communication when automatic switching of wireless data communication networks is performed based on a condition. FIG. 7 is a sequence diagram illustrating the process.

Either of the switching controllers 34, 44 in the application proxies 30, 40 will determine the switching to another wireless data communication network according to a process described below. For convenience of explanation, it is herein assumed that the switching controller 44 in the application proxy 40 of the intermediary computer 20 has determined the switching to another wireless data communication network as shown by (I) in FIG. 7.

To begin with, the application proxy 40 of the intermediary computer 20 uses the control message transmitter/receiver 43 to transmit a switching request message to the control message transmitter/receiver 33 in the application proxy 30 of the mobile computer 10 as shown by (II) in FIG. 7.

The address of the mobile computer 10 is required to allow for transmission of the switching request message but the control message transmitter/receiver 43 will acquire that address by referring to the terminal information management table 46 with a terminal ID as a search key because that address is associated with a terminal ID in the terminal information management table 46.

If the switching controller 34 in the application proxy 30 of the mobile computer 10 determines the switching to another wireless data communication network, the application proxy 30 of the mobile computer 10 will use the control message transmitter/receiver 33 to transmit a switching request message to the control message transmitter/receiver 43 in the application proxy 40 of the intermediary computer 20. However, the control message transmitter/receiver 33 will transmit the switching request message with the address of the intermediary computer 20 because that address is well known.

When the switching request message is transmitted, a process will be performed, as shown by (III) in FIG. 7, to safely release all sessions being established between the client function 32 in the application proxy 30 of the mobile computer 10 and the server function 42 in the application proxy 40 of the intermediary computer 20.

More specifically, the session release process is accomplished by the client function 32 suspending data transmission for all sessions and by the server function 42 confirming the reception of data which have not yet arrived for all sessions and thereafter disconnecting all sessions.

Figure 8:
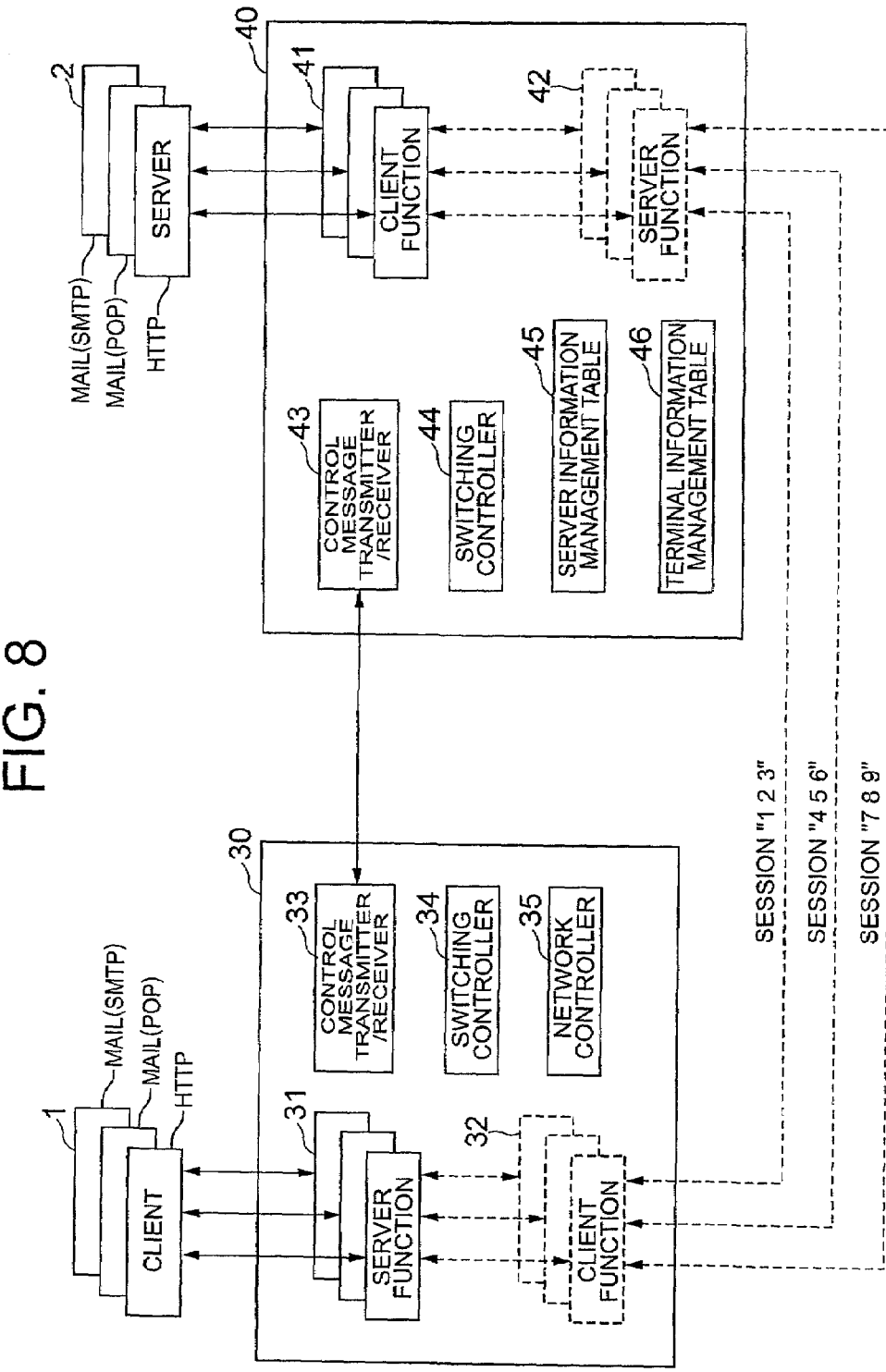
FIG. 8 is an explanatory drawing for a process of the present invention.

According to the session release process, as shown in FIG. 8, all sessions established between the mobile computer 10 and the intermediary computer 20 for switching the wireless data communication networks will disappear.

To confirm that the reception of unreceived data is complete, the client function 32 as a transmitter transmits a marker indicating the end of data when transmission for each session is suspended and the server function 42 as a receiver detects the reception of the marker. Since this will ensure that any session can be released safely, the application proxies 30, 40 can continue the communication after the wireless data communication networks have been switched, simply by transmitting/receiving untransmitted data which remains after the switching.

To suspend data transmission, a flow control function of TCP/IP is usually used but alternatively, a buffer may be provided.

When the safe session release is finished, the application proxy 30 of the mobile computer 10 uses the control message transmitter/receiver 33 to transmit a execution message for switching to the control message transmitter/receiver 43 in the application proxy 40 of the intermediary computer 20 as shown by (IV) in FIG. 7 and upon receipt of this message, the control message transmitter/receiver 43 returns a response indicating that it is received.

When the application proxy 30 of the mobile computer 10 confirms this response, it uses the network controller 35 to disconnect a currently-used wireless data communication network and to reconnect to the access router for another wireless data communication network to which the communication is to be switched as shown by (V) in FIG. 7. For example, for switching from a packet-switched network to a circuit-switched network, it will reconnect to the access router for the circuit-switched network.

Reconnecting to the wireless data communication network to which the communication is to be switched will cause a new IP address to be assigned by the access router for the wireless data communication network to which the communication is to be switched. Therefore, when the network controller 35 acquires the new IP address, the application proxy 30 of the mobile computer 10 uses the control message transmitter/receiver 33 to transmit the new IP address, which is associated with its own terminal ID, to the control message transmitter/receiver 43 in the application proxy 40 of the intermediary computer 20 as shown by (VI) in FIG. 7, so that the new IP address is registered with the terminal information management table 46 as shown by (VII) in FIG. 7.

Thus, the application proxy 30 of the mobile computer 10 can hereafter use the new IP address to communicate with the application proxy 40 of the intermediary computer 20.

Then, in order to issue a session resume request, the application proxy 30 of the mobile computer 10 uses the server function 31 to regenerate its counterpart client function 32 which has disappeared. Alternatively, regeneration of the client function 32 may be accomplished by a mechanism other than the server function 31.

When the client function 32 is regenerated, the application proxy 30 of the mobile computer 10 uses the regenerated client function 32 to specify the session number of a disappeared session as well as to issue a session resume request for a safely disconnected session to the control message transmitter/receiver 43 in the application proxy 40 of the intermediary computer 20 through the control message transmitter/receiver 33 as shown by (VIII) in FIG. 7.

In response to the session resume request, the application proxy 40 of the intermediary computer 20 uses the control message transmitter/receiver 43 to regenerate the server function 42 pointed to by the specified session number to register a pointer to the regenerated server function 42 with the terminal information management table 46.

In other words, the session number is used to regenerate the client function 32 and the server function 42 for reestablishing the session so that the correspondence between the server function 31 and the client function 41 which have been associated with each other before switching of the wireless data communication network can be maintained even after the wireless data communication networks have been switched. Alternatively, regeneration of the server function 42 may be accomplished by a mechanism other than the control message transmitter/receiver 43.

Thus, as shown in (IX) in FIG. 7, a session will be resumed between the application proxy 30 of the mobile computer 10 and the application proxy 40 of the intermediary computer 20, thereby resuming data transmission/reception in the same conditions as before the switching.

In this way, the configuration according to the present invention can allow for continuous communication between the application proxy 30 of the mobile computer 10 and the application proxy 40 of the intermediary computer 20 even when the wireless data communication networks are switched.

More specifically, since the session between the client 1 and the application proxy 30 of the mobile computer 10 as well as the session between the server 2 and the application proxy 40 of the intermediary computer 20 are not affected by the switching of wireless data communication networks, the communication between the client 1 and the server 2 can be continued even when the wireless data communication networks are switched.

In addition, such a network switching can be implemented without the user being aware of it, because it is performed automatically.

Moreover, the present invention can be advantageously implemented simply by installing the application proxies 30, 40 on the mobile computer 10 and the intermediary computer 20 on the Internet or an intranet, respectively, so that it can be constructed at low costs without the need for change to any existing infrastructure.

Furthermore, since the application proxy 30 installed on the mobile computer 10 is taken by the client 1 as a server and the application proxy 40 installed on the intermediary computer 20 is taken by the server 2 as a client, there is no need to rewrite any existing client or server software.

According to the present invention, the mobile computer 10 usually connects to an always-connectable packet-switched network and automatically switches to a circuit-switched network on a temporary basis through the above-mentioned wireless data communication network switching function only when the switching controllers 34, 44 estimate a large continuous communication traffic. When the continuous communication traffic is finished, the mobile computer 10 automatically switches to the previous packet-switched network through the above-mentioned wireless data communication network switching function.

With these operations, a packet-switched network will be used for a small discrete communication traffic and a circuit-switched network will be used for a large continuous communication traffic. Thus, a wireless data communication network which is determined optimum in terms of service charge can be used.

Next, the communication traffic estimation process performed by the switching controllers 34, 44 will be described below.

The switching controllers 34, 44 estimate a communication traffic (a) by measuring the size of contents to be transmitted/received between the client 1 and the server 2 or (b) from application-specific traffic information.

In order for the switching controllers 34, 44 to measure the size of contents to be transmitted/received between the client 1 and the server 2 for communication traffic estimation, when a transmitted/received content having a size larger than a predetermined value (threshold) is detected, they determine that a continuous traffic occurs and then control the switching to a circuit-switched network.

For such an estimation process, the switching controllers 34, 44 comprise an application protocol analyzer, which is used to analyze application protocol header information for obtaining a content size.

If the user simultaneously uses a plurality of applications, the total amount of contents for all applications will be used as a content size for estimation.

Alternatively, if the application proxies 30, 40 are configured to hold contents transmitted from the client 1 or the server 2 in the application proxies 30, 40 themselves for a period rather than transfer them immediately, the total content size may exceed a threshold more frequently and thus, a circuit-switched network may be used more actively, thereby resulting in a smaller service charge.

When the communication is switched to a circuit-switched network in response to a content size exceeding a threshold, the switching controller 34 of the mobile computer 10 can calculate a restoration time depending on the content size. The restoration time is a time it takes to transmit the content over the circuit-switched network. Therefore, when the restoration time expires, the application proxy 30 of the mobile computer 10 determines that the continuous traffic is finished and then operates to switch to the previous packet-switched network, so that the circuit-switched network will not be used for a longer period than necessary and for a discrete communication traffic, a packet-switched network can be always used.

In this way, the present invention uses a communication traffic estimation based on a content size, so that a circuit-switched network can be used for a large continuous communication traffic or a large-sized content and a packet-switched network can be used for a small discrete communication traffic or a small-sized content, thereby resulting in a reduced service charge.

For the automatic switching used for the prior ISDN service AO/DI (this is the automatic switching of a packet switching channel and a circuit switching channel within a single wireless data communication network and essentially different from the automatic switching according to the present invention), a communication traffic is obtained by measuring a buffer usage or a transfer rate at an access router or a mobile computer adapter.

However, such a communication traffic measurement indicates a current communication traffic rather than a future communication traffic estimation. Therefore, according to the prior method, unnecessary switching to a circuit-switched network may be caused in cases where a very large communication traffic occurs only at a moment and thereafter the communication traffic is reduced to "0", thereby causing a larger service charge than expected.

On the contrary, according to the present invention, a content size described in an application protocol header is read out to estimate a minimum communication traffic that may occur in future, so that no unnecessary switching to a circuit-switched network may occur and the problems as described for the prior method can be avoided.

In addition, many client/server applications are configured so that a server notifies a client of a content size before transmission because the client is required to confirm that it has received the content successfully. Therefore, the inventive process to estimate a communication traffic from a content size measurement can be effectively applicable to many application protocols.

Moreover, according to the present invention, contents are held in the application proxies 30, 40 for a period to increase the total size of contents to be transmitted at a time, so that originally discrete communication traffics can be transformed into a larger continuous one and a circuit-switched network can be efficiently used for least cost.

As described above, the switching controllers 34, 44 may also estimate a communication traffic based on application-specific traffic information.

When a client 1 transmits a service request message to the application proxy 30 in the mobile computer 10, the application proxy 30 receives the service request message through a server function 31 corresponding to the application type (which has a port number corresponding to the application type) and thus, the application type of the client 1 can be identified.

In addition, depending on the application type, it can be estimated whether a small or large content is to be transmitted.

For this purpose, the switching controllers 34, 44 may have a table for managing the correspondence between application types (or port numbers) and communication traffics so that an application-specific communication traffic can be identified (estimated) by referring to the table.

In this configuration, the switching controllers 34, 44 control the switching to a circuit-switched network when they detect that an application may produce a continuous communication traffic. Subsequently, when the switching controller 34 of the mobile computer 10 determines that the communication between the client 1 and the server 2 is finished, the communication is switched back to a packet switched network. The communication between client 1 and the server 2 can be terminated by detecting that the client 1 disconnects a session between the application proxy 30 of the mobile computer 10 and itself. Thus, the communication can be switched to an optimum wireless data communication network for each application.

A wireless LAN used for offices or homes is also a wireless data communication network to which the present invention is applicable and it has an additional advantage that the wireless LAN is a no-charge system. Therefore, if the wireless LAN is made available to the user, he/she may usually want to switch from a previously-used wireless WAN (such as a packet-switched network or a circuit-switched network) to the wireless LAN.

To meet his/her desire, the application proxy 30 of the mobile computer 10 can provide the network controller 35 with a function to detect whether a new wireless data communication network is made available, and thus, when the detection function detects that a new wireless data communication network is made available, the application proxy 30 registers the new wireless data communication network with the switching controller 34.

Then, the switching controller 34 is used to determine whether the new wireless data communication network is an optimum one for all applications in terms of service charge, and when it is determined that the new wireless data communication network is advantageous in terms of service charge, the switching function described above is used to switch to the new wireless data communication network while keeping a session being established.

According to this configuration, when the network controller 35 first detects a new wireless data communication network made available, the switching controller 34 in the application proxy 30 of the mobile computer 10 determines whether the new wireless data communication network is a no-charge wireless LAN. When it determines that the new wireless data communication network is a wireless LAN, it switches to the wireless LAN, which is continuously used thereafter until it is made unavailable.

If the new wireless data communication network is a chargeable wireless WAN rather than a wireless LAN and both a packet-switched network and a circuit-switched network are newly made available, these wireless data communication networks are switched through the switching process described above.

More specifically, when the server function 31 detects a service request issued by the client 1, the switching controller 34 in the application proxy 30 of the mobile computer 10 refers to a table for managing the correspondence between application types and communication traffics to determine whether an application of the client 1 produces a continuous communication traffic.

When it is determined that the application produces a continuous communication traffic in a steady manner, the communication is switched to a circuit-switched network, which is continuously used thereafter until the application terminates. On the other hand, when it is determined that the application does not produce a continuous communication traffic in a steady manner but its communication traffic may vary dynamically, the communication is switched between a packet-switched network and a circuit-switched network depending on a content size.

Next, the present invention will be further described with reference to FIG. 9.

Figure 9:
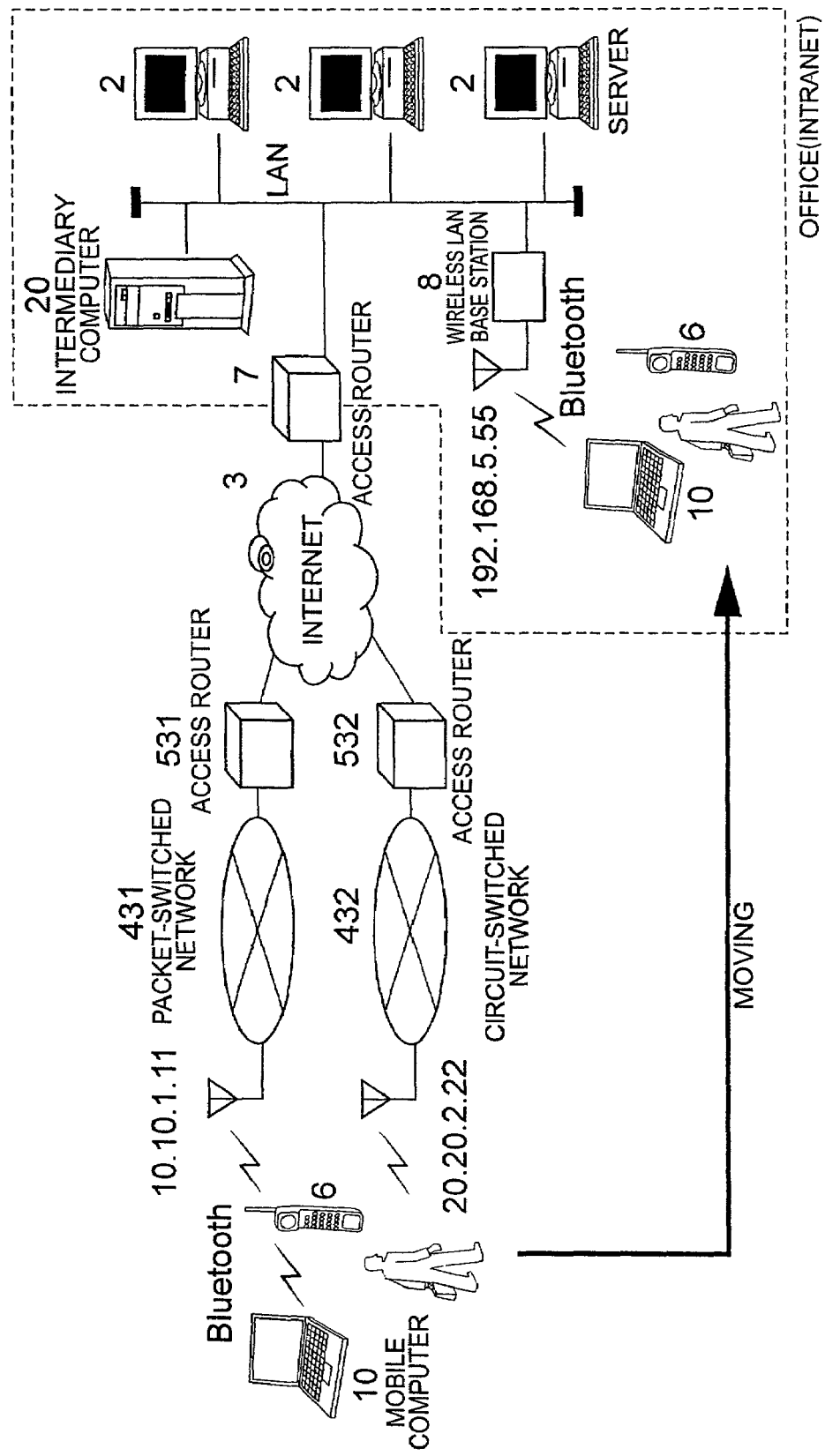
FIG. 9 is a detailed block diagram for an embodiment of the present invention.

A mobile telephone 6 in FIG. 9 is capable of using both packet and circuit switching systems. A mobile computer 10 is a notebook computer or a personal digital assistant (PDA) and can be connected to access routers 531, 532 for a packet-switched network 431 and a circuit-switched network 432, respectively, through the mobile telephone 6 as well as directly to an access router 7 on an intranet LAN.

The connections between the mobile computer 10 and the mobile telephone 6 and between the mobile computer 10 and a wireless LAN base station 8 are accomplished with Bluetooth (a short-range wireless transmission technology) and the switching between the mobile telephone network (wireless WAN) and the wireless LAN is implemented by the mobile computer 10 controlling the Bluetooth architecture. In addition, when the mobile telephone network is used, the switching between the packet-switched network 431 and the circuit switched network 432 is implemented by the mobile computer 10 controlling the mobile telephone 6 with AT commands.

These connections may be accomplished through the IrDA (Infrared Data Association) technology instead of the Bluetooth architecture or the connection between the mobile computer 10 and the mobile telephone 6 may be accomplished with a serial cable or other wiring.

A intermediary computer 20 is constructed by a personal computer or workstation connected to an office LAN and may be deployed on the Internet. A server 2 is an HTTP server, a POP server, an SMTP server, an FTP server, or an NNTP server and communicates with a client 1 in the mobile computer 10 such as a browser, mailer, FTP client, or news reader through an application protocol on the TCP/IP protocol.

The access routers 531, 532, 7 for the packet-switched network 431, the circuit-switched network 432, and the LAN have different IP address architectures and IP addresses assigned to the mobile computer 10 by the access routers are different from each other, for example, 10.10.1.11, 20.20.2.22, and 192.168.5.55, respectively.

The access router 531 for the packet-switched network 431 is usually managed by a carrier network, the access router 532 for the circuit-switched network 432 is managed by an Internet service provider (ISP), and the access router 7 for the LAN is managed by the user office.

It is very difficult to introduce a mechanism for cooperation among these access routers managed by the different administrative domains and thus, it may be a significant advantage that, as with the present invention, the automatic switching of wireless data communication networks can be implemented at low costs simply by installing the application proxies 30, 40 on the user's mobile computer 10 and the intermediary computer 20 in the office.

The application proxies 30, 40 installed on the mobile computer 10 and the intermediary computer 20 are software written in Java, C++, or other high-level languages. Since the application proxies 30, 40 operate as an application, they can act as the identical program on all mobile computers 10 if they are written in such a language as Java.

The client function of the application proxies 30, 40 is a client socket which transmits a request from the client 1 to an application-specific port number and the server function of the application proxies 30, 40 is a server socket which receives the request from the client 1 with the application-specific port number.

When the user defines to each client 1 of the mobile computer 10 a loopback address 127.0.0.1 as a server address, the application proxy 30 of the mobile computer 10 can be defined as a server for the client 1.

As shown in FIG. 4, the server information management table 45 is a table provided to retrieve a server address for an application based on an application-specific port number.

When the application proxy 40 of the intermediary computer 20 receives a service request message from the client 1 transferred from the application proxy 30 of the mobile computer 10, it can search the server information management table 45 with the received port number to identify a server 2 to which the service request message is to be transferred.

As shown in FIG. 5, the terminal information management table 46 manages IP addresses for each mobile computer 10 as well as their corresponding session management tables. These session management tables are those for managing pointers to socket objects (server function 42) which control sessions with session numbers. A session number may be assigned by the intermediary computer 20 when a session is established or it may be a port number which can uniquely identify a session.

For IP addresses managed in the terminal information management table 46, an IP address assigned by a new wireless data communication network to which the mobile computer 10 is connected is registered through a terminal ID. Thus, the intermediary computer 20 can identify the mobile computer 10 from an IP address thereafter.

A pointer to a socket object managed in the terminal information management table 46 is registered with a session management table each time when a new session with the application proxy 30 of the mobile computer 10 is produced.

Next, the operation of the present invention as configured above will be briefly described below.

As described above, when the wireless data communication networks are switched and a new IP address is assigned by an access router for the new wireless data communication network, the mobile computer 10 registers the newly-assigned IP address with the terminal information management table 46 while keeping the correspondence between the IP address and a terminal ID. Subsequently, the mobile computer 10 requests the intermediary computer 20 to resume a session with a session number which has been assigned before switching.

Upon receipt of the session resume request, the intermediary computer 20 generates a server socket (server function 42) pointed to by the specified session number and defines that the session management table should point to the server socket for session reestablishment, so that the communication between the mobile computer 10 and the intermediary computer 20 can be resumed.

On the contrary, the network controller 35 of the mobile computer 10 controls the Bluetooth architecture to detect a Bluetooth-containing mobile telephone 6 and a wireless LAN base station 8 and depending on the detection result, it will connect to the mobile telephone 6 or to the wireless LAN base station 8. Among various Bluetooth-compatible devices, at least the mobile telephone 6 can be operated with AT commands to switch between the packet-switched network 431 and the circuit-switched network 432.

Figure 10:
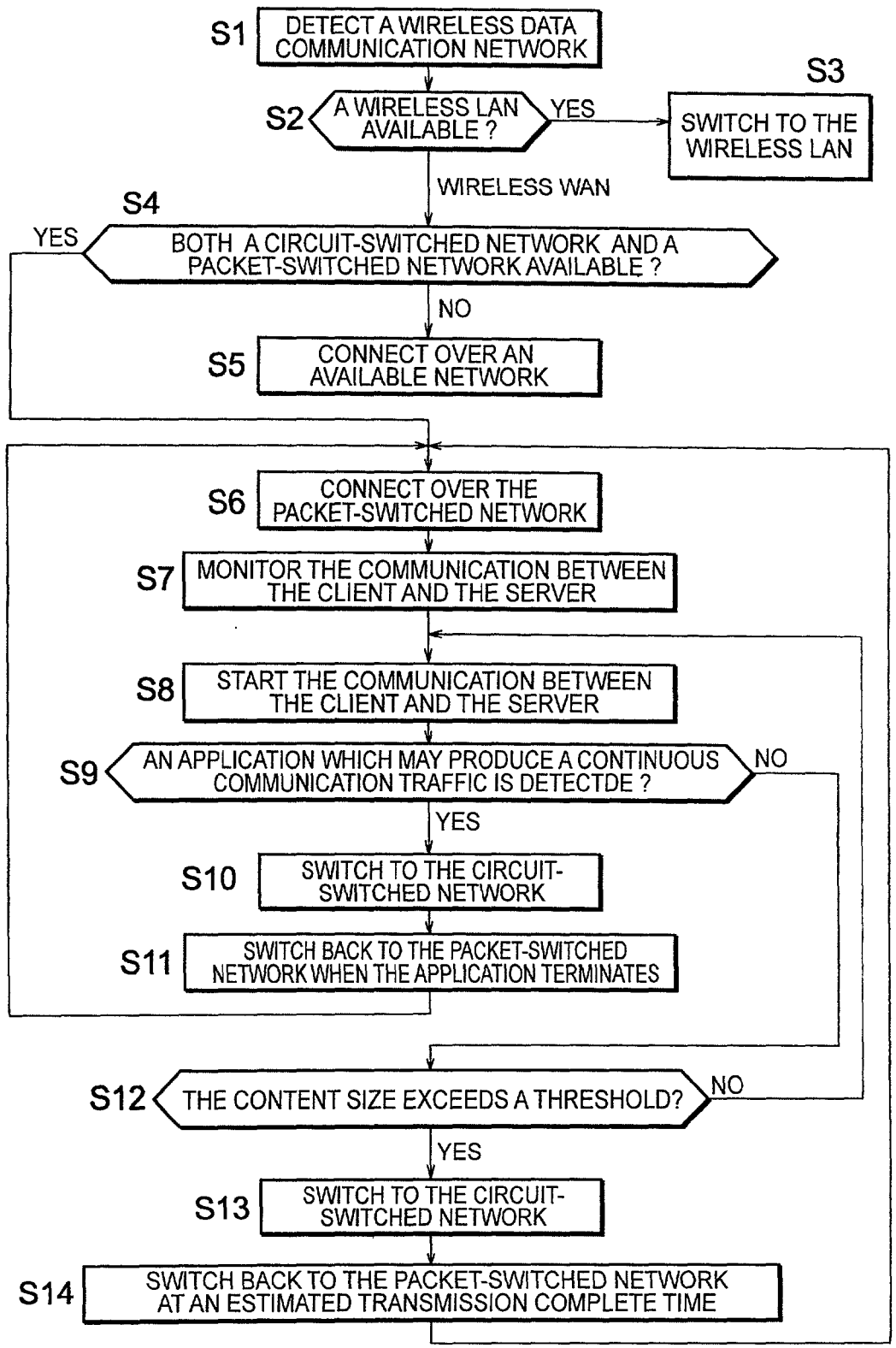
FIG. 10 shows an embodiment of a process flow performed by an application proxy.

FIG. 10 shows an embodiment of a process flow performed when the application proxy 30 of the mobile computer 10 is configured to detect a switching of wireless data communication networks.

As shown in the process flow, when the application proxy 30 of the mobile computer 10 detects, for example, a wireless data communication network (step S1), it determines from Bluetooth whether the wireless LAN base station 8 is made available (step S2). If the wireless LAN base station 8 is made available, the communication is switched to a no-charge wireless LAN (step S3).

On the contrary, if the wireless LAN base station 8 is not made available (that is, a wireless WAN is made available), it is determined whether both a circuit-switched network and a packet-switched network are made available (step S4). If only one of them is made available, a connection is made over the available network (step S5). If both of them are made available, a connection is made over the packet-switched network (step S6) and a communication traffic between the client 1 and the server 2 is monitored (step S7). Then, the communication starts over the network (step S8) and it is monitored whether an application which may produce a continuous communication traffic is detected (step S9). If such an application is detected, the communication is switched to the circuit-switched network for lower charges (step S10) and then the communication is switched back to the packet-switched network when the application terminates (step S11). Namely, step S6 and subsequent steps are performed.

For example, when an application which handles characters only like a chat is used, the communication is switched to the packet-switched network because of small communication traffics, and when a streaming application like Real Player, Real Audio, or VDO Live is used, the communication is switched to the circuit-switched network because of large communication traffics.

Detecting whether the application produces a continuous communication traffic can be accomplished by referring to a table for managing the correspondence between a port number and a communication traffic of the application pointed to by the port number, since the client 1 transmits a service request message and the server function 31 of the mobile computer 10 receives it with an application-specific port number.

If no application which may produce a continuous communication traffic is detected at step S9, it is monitored whether the content size exceeds a threshold (step S12). If the content size exceeds the threshold, the communication is switched to the circuit-switched network of lower charge (step S13) and switched back to the packet-switched network when an estimated transmission complete time comes (step S14) Namely, step S6 and subsequent steps are performed. If the size does not exceed the threshold at step S12, step S8 is performed.

Figure 11:
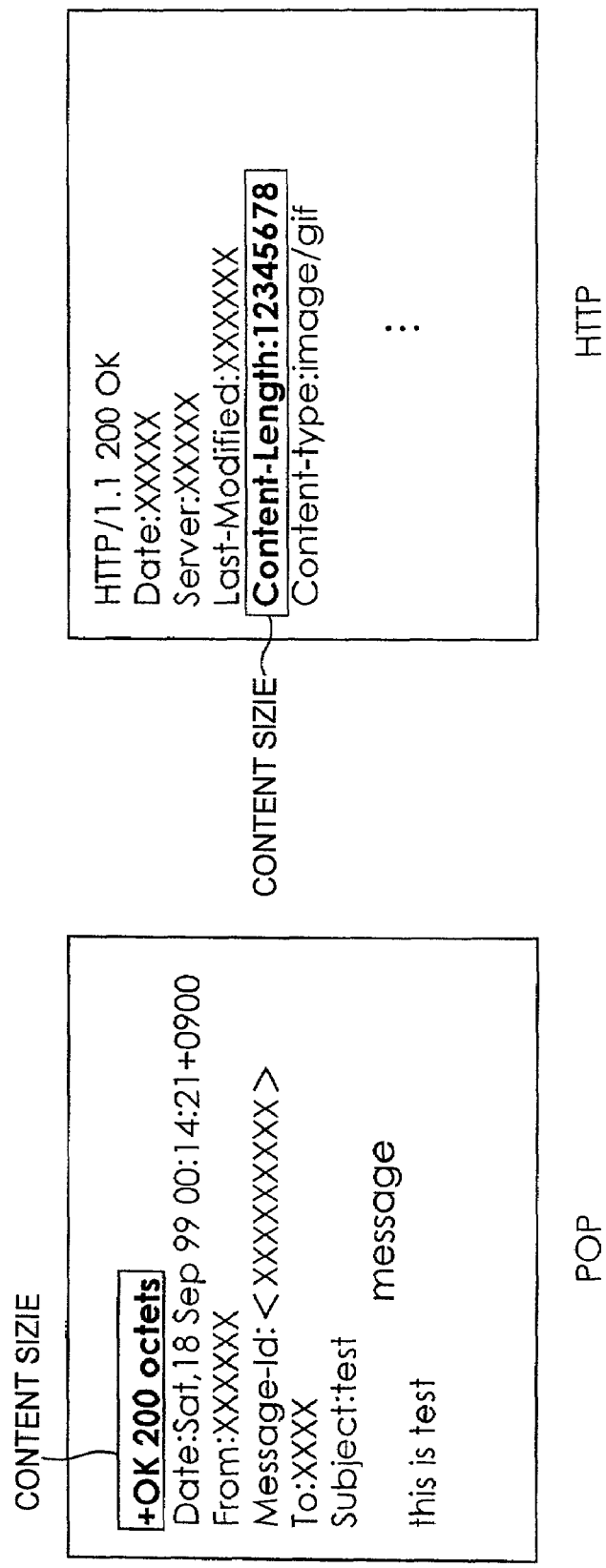
FIG. 11 is an explanatory drawing for a header of an application protocol.
Figure 12:
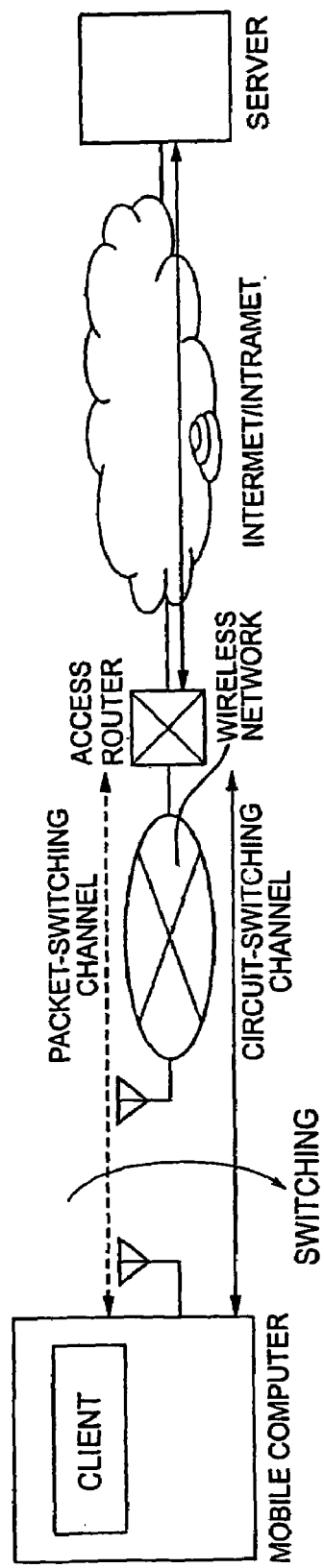
FIG. 12 is an explanatory drawing for a prior art.
Figure 13:
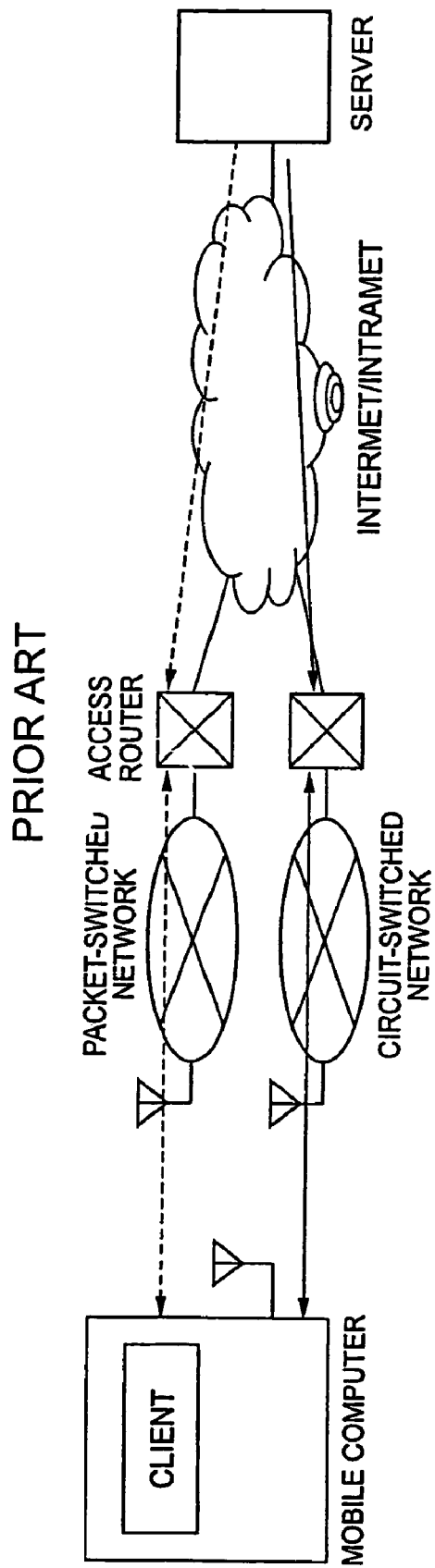
FIG. 13 is an explanatory drawing for a wireless data communication network system to which the present invention is applied.

For example, since a content size is described in a header for each application protocol as shown in FIG. 11, this description is analyzed to detect the content size and then it is determined whether the content size exceeds a threshold. If the content size exceeds the threshold, the communication is switched to the circuit-switched network for lower charges.

Considering, for example, a packet-switched network made available from KDDI, PacketOne network, and a circuit-switched network available from KDDI, cdmaOne network, a threshold where positioning of these two networks in terms of service charge is reversed is 24 KB or more. Although control data is communicated between the mobile computer 10 and the intermediary computer 20 for switching wireless data communication networks, the quantity of this control data can be ignored if the threshold is large enough.

Thus, according to the present invention, even when the communication address of a mobile computer owned by the user is changed due to switching of the wireless data communication networks, data exchanges can be performed without awareness of such a change and the wireless data communication networks can be switched to optimize the service charge.

In addition, this configuration for switching the wireless data communication networks can be implemented without change to any existing access router as well as to any existing client or server simply by installing an application proxy on a mobile computer owned by the user and any intermediary computer provided in the Internet/intranet.

Moreover, according to the present invention, since switching of the wireless data communication networks is accomplished based on an estimated communication traffic but it is not affected by temporary communication traffic conditions, further optimization of service charges can be achieved.

Thus, the present invention can meet the need to have a service which can automatically switch from a chargeable wireless WAN to a no-charge wireless LAN.

Particularly, since prior automatic switching between a packet-switched network and a circuit-switched network is accomplished based on a buffer usage or a transfer rate, a failed communication traffic estimation may cause higher service charges than expected.

However, the present invention can solve this problem because a communication traffic is estimated by measuring a content size or by determining an application type, thereby resulting in no estimation failure.

In addition, the introduction of the present invention will not affect data traffics communicated between the client and the server. The prior method wherein some information is appended to an existing protocol for automatic switching may increase in service charge for the packet-switched network due to increased data traffics but the present invention will not cause such a problem.

Moreover, according to an implementation of the present invention, contents are held in the application proxies for a period and small discrete communication traffics are transformed into a larger continuous one, so that the circuit-switched network can be efficiently used for lower charges.

What is claimed is:

1. A wireless data communication network switching system, comprising:
   a server;
   a network to which the server is connected;
   first and second access routers that are connected to the network and are different from each other;
   first and second wireless data communication networks that are connected to the first and second access rooters corresponding thereto, respectively;
   a mobile computer being capable of connecting to the first and second wireless data communication networks;
   a client deployed in the mobile computer and being able to communicate with the server via any one of the first and/or second wireless data communication networks;
   a first switching device connected to the network, and operating as an intermediary mechanism for the server; and
   a second switching device provided in the mobile computer, operating as an intermediary mechanism for the client, controlling switching of the first and second wireless data communication networks in cooperation with the first switching device, and comprising:
      means for releasing a session being established in a response to a switching request for the first or second wireless data communication network in cooperation with the first switching device,
      means for connecting to the first or second wireless data communication network to which the communication is to be switched and acquiring a new communication address assigned in response to the connection, after the release is complete,
      means for notifying the first switching device of the communication address, and
      means for resuming the released session in cooperation with the first switching device following the notification,
   wherein the second switching device in the mobile computer switches the communication from the first wireless data communication network to the second wireless data communication network, so that the communication is performed via the first wireless data communication network until the releasing and via the second wireless data communication network from the resuming.

2. The wireless data communication network switching system according to claim 1, wherein the means for releasing transmits a marker indicative of last data when the session is suspended to inform the first switching device of data that should have been received when the session is suspended.

3. The wireless data communication network switching system according to claim 1, further comprising:
means for issuing the switching request by estimating a communication traffic between the client and the server.

4. The wireless data communication network switching system according to claim 3, wherein the means for issuing estimates the communication traffic by measuring size of a content to be communicated between the client and the server.

5. The wireless data communication network switching system according to claim 4, wherein the means for issuing issues another switching request to switch back to the previous wireless data communication network, after issuing the switching request depending on the communication traffic estimated from the content size and when the content is complete.

6. The wireless data communication network switching system according to claim 3, wherein the means for issuing estimates a communication traffic from an application type.

7. The wireless data communication network switching system according to claim 6, wherein the means for issuing issues another switching request to switch back to the previous wireless data communication network, after issuing the switching request depending on the communication traffic estimated from the application type and when the application is terminated.

8. The wireless data communication network switching system according to claim 1, further comprising:
means for transforming discrete communication traffics into a continuous communication traffic by holding data to be transmitted for a period.

9. The wireless data communication network switching system according to claim 1, further comprising:
means for detecting whether a new wireless data communication network is made available; and
means for determining whether the new wireless data communication network is advantageous in terms of service charge over a currently-used wireless data communication network and issuing a switching request to switch to the new wireless data communication network when it is determined advantageous.

10. The wireless data communication network switching system according to claim 1, wherein the first switching device comprises:
means for transferring a service request to the server by identifying a server pointed to by a port number specified in the service request issued by the client;
means for releasing a session being established in a response to a switching request for the wireless data communication networks in cooperation with the second switching device;
means for acquiring a communication address for the second switching device assigned by a wireless data communication network switched by the second switching device in response to the switching request; and
means for resuming the released session in cooperation with the second switching device following the acquisition.

11. The wireless data communication network switching system according to claim 10, wherein the means for releasing detects a marker transmitted by the second switching device to detect the completion of the reception of the data that should have been received when the session is suspended.

12. The wireless data communication network switching system according to claim 10, further comprising:
means for issuing the switching request by estimating a communication traffic between the client and the server.

13. The wireless data communication network switching system according to claim 12, wherein the issuance means estimates the communication traffic by measuring size of a content to be communicated between the client and the server.

14. The wireless data communication network switching system according to claim 13, wherein the means for issuing issues another switching request to switch back to the previous wireless data communication network, after issuing the switching request depending on the communication traffic estimated from the content size and when the content is complete.

15. The wireless data communication network switching system according to claim 12, wherein the means for issuing estimates a communication traffic from an application type.

16. The wireless data communication network switching system according to claim 15, wherein the means for issuing issues another switching request to switch back to the previous wireless data communication network, after issuing the switching request depending on the communication traffic estimated from the application type and when the application is terminated.

17. The wireless data communication network switching system according to claim 10, further comprising:
means for transforming discrete communication traffics into a continuous communication traffic by holding data to be transmitted for a period.

* * * * *

UNITED STATES PATENT AND TRADEMARK OFFICE
CERTIFICATE OF CORRECTION

| | | |
|---|---|---|
| PATENT NO. | : 7,075,908 B2 | Page 1 of 1 |
| APPLICATION NO. | : 09/960404 | |
| DATED | : July 11, 2006 | |
| INVENTOR(S) | : Yuichiro Noguchi et al. | |

It is certified that error appears in the above-identified patent and that said Letters Patent is hereby corrected as shown below:

On the Title page:

(57) Abstract, Col. 2, line 2, after "as" change "a" to --an--

In the Specification:

Col. 20, line 33, change "rooters" to --routers--

Signed and Sealed this

Fifteenth Day of May, 2007

JON W. DUDAS
*Director of the United States Patent and Trademark Office*